United States Patent [19]

Cyrus et al.

[11] Patent Number: 4,504,192

[45] Date of Patent: Mar. 12, 1985

[54] JET SPOILER ARRANGEMENT FOR WIND TURBINE

[75] Inventors: Jack D. Cyrus, Corrales; Emil G. Kadlec; Paul C. Klimas, both of Albuquerque, all of N. Mex.

[73] Assignee: The United States of America as represented by the United States Department of Energy, Washington, D.C.

[21] Appl. No.: 532,430

[22] Filed: Sep. 15, 1983

[51] Int. Cl.³ .............................................. F03D 7/06
[52] U.S. Cl. ......................................... 416/41; 416/91; 416/227 A; 415/DIG. 1
[58] Field of Search ............ 416/227 A, 91, 4, 121 A, 416/41 A, 41 R, DIG. 7, 32; 415/DIG. 1

[56] References Cited

U.S. PATENT DOCUMENTS

| 1,501,248 | 7/1924 | Strong | 416/91 |
|---|---|---|---|
| 1,786,057 | 12/1930 | Fales | 416/91 X |
| 2,156,133 | 4/1939 | Troller | 416/92 X |
| 2,516,489 | 7/1950 | Stalker | 416/91 X |
| 2,759,548 | 8/1956 | Yuan et al. | 416/91 X |
| 3,547,377 | 12/1970 | Frey | 446/91 X |
| 4,082,479 | 4/1978 | Rangi et al. | 416/227 A X |
| 4,142,822 | 3/1979 | Herbert et al. | 416/227 A X |
| 4,197,053 | 4/1980 | Reinke | 416/91 |
| 4,303,835 | 12/1981 | Bair | 416/17 X |
| 4,355,955 | 10/1982 | Kisovec | 416/51 A X |

FOREIGN PATENT DOCUMENTS

| 29498 | 8/1925 | France | 415/DIG. 1 |
|---|---|---|---|
| 768647 | 8/1934 | France | 416/91 |
| 905544 | 12/1945 | France | 416/227 A |
| 2290585 | 6/1976 | France | 416/41 A |

*Primary Examiner*—Everette A. Powell, Jr.
*Attorney, Agent, or Firm*—George H. Libman; Albert Sopp

[57] ABSTRACT

An air jet spoiler arrangement is provided for a Darrieus-type vertical axis wind-powered turbine. Air is drawn into hollow turbine blades through air inlets at the ends thereof and is ejected in the form of air jets through small holes or openings provided along the lengths of the blades. The air jets create flow separation at the surfaces of the turbine blades, thereby inducing stall conditions and reducing the output power. A feedback control unit senses the power output of the turbine and controls the amount of air drawn into the air inlets accordingly.

13 Claims, 3 Drawing Figures

JET SPOILER ARRANGEMENT FOR WIND TURBINE

The U.S. Government has rights in this invention pursuant to Contract No. DC-AC04-76DP00789 between the Department of Energy and Sandia Corporation.

BACKGROUND OF THE INVENTION

The present invention relates to Darrieus turbines and more particularly to an improved apparatus for controlling the level of output power produced by such a turbine as the fluid velocity varies.

Because of the demands for alternate sources of energy, increasing attention has been focused on wind power as an energy source. Vertical axis wind turbines have received particular attention because of their structural stability and their advantages over conventional windmills. In this regard, these advantages include the fact that no steering mechanism is required and that no heavy gear box and/or generator is needed at the top of the supporting tower.

Two principal types of vertical axis wind turbines are the Sovonius rotor and the Darrieus rotor. The two-bladed Savonius rotor basically comprises a pair of opposing half cylinders which are offset from the vertical support axis to form an S-shaped configuration, and uses the difference between wind forces acting against the concave and convex surfaces to generate power. Examples of Savonius rotors or modifications thereof are disclosed, for example, in U.S. Pat. Nos. 4,117,009 (Baum, Sr. et al.) and 4,117,014 (Kephart, Jr.).

The Darrieus rotor conventionally comprises at least one thin ribbon-type half-hoop, the chord of each half-hoop defining the axis of rotation. The cross-sectional profile of the continuous ribbon forming each half-hoop is that of a stream-lined airfoil. For a vertical axis wind turbine, each half-hoop attached to the central shaft defines the vertical axis of rotation with the blunt leading edge oriented so as to face into the relative air flow created by rotation of the central vertical shaft. The basic Darrieus rotor is described, for example, in U.S. Pat. No. 1,835,018 (Darrieus) and further modifications thereof are described, for example, in U.S. Pat. Nos. 4,082,479 (Rangi et al.) and 4,112,311 (Theyse).

As will appear, the present invention is concerned with turbines of the Darrieus type, and modifications thereof, as well as with related vertical axis wind turbines. A problem associated with vertical axis wind turbines concerns the operation thereof at high wind speeds. Specifically, during normal operation, the power output of the turbine increases as the wind speed increases until inherent stall conditions are achieved. This generally results in turbine ratings that are higher than desired and in higher energy costs, since the costs associated with the power conversion machinery are a function of the rating.

The Rangi et al. patent (U.S. Pat. No. 4,082,479) referred to above is concerned with preventing overspeeding of the rotor of a Darrieus turbine in high winds so as to prevent damage to the turbine and to this end, provides for mechanical spoilers in the form of relatively thin blade shaped spoiler elements which are attached to the airfoil section and which, due to centrifugal force, assume a position generally transverse to the air flow direction so as to increase drag and control rotor overspeeding. U.S. Pat. No. 4,115,032 of Lange discloses a drag-type turbine wherein a braking effect is created at high wind speeds to combat overspeeding. U.S. Pat. No. 4,117,009 of Baum discloses a Savonius-type system wherein a centrifugally actuated spoiler door section which opens at wind speeds above a predetermined level to dump air out of the rotor.

SUMMARY OF THE INVENTION

In accordance with the invention, apparatus is provided for actively controlling the power output of Darrieus turbines and like devices so as to control the maximum turbine rating and the fluid speed at which that maximum rating is achieved. The apparatus of the invention is simple and results in reducing the cost of energy.

Generally speaking, a wind embodiment of the invention involves inducing aerodynamic stall along a turbine blade through the use of jet or blown-air spoilers. As the turbine rotates, air pressure is induced by centrifugal acceleration inside of the hollow blade. The magnitude of the induced pressure within the blade is equivalent to the dynamic pressure of the undisturbed air relative to the moving blade and thus, by leaving the blade ends (or at least one end) open and providing openings or apertures along the lengths of the blade, air will be caused to flow into the ends of the blades and to be ejected in the form of air jets through the openings along the blade. These jets of air produce flow separation, and result in stall conditions and consequent power reduction.

Thus, according to a preferred embodiment of the invention, a wind-powered turbine is provided comprising a rotor assembly, and a generator powered from the rotor assembly through a drive unit, the rotor assembly comprising at least one hollow rotor blade mounted for rotation about a predetermined axis, and each hollow blade including a plurality of apertures formed therein along a substantial portion of the length thereof and having an inlet opening of at least one end thereof through which air is drawn into the blade during rotation of the rotor assembly. The apertures of each blade are located along the blade surface between the leading edge and trailing edge of that blade such that air drawn into the inlet opening at the one end of the hollow blade will flow out of the apertures and interfere with the air flow across the blade and thereby induce stall conditions, whereby the power produced by the turbine is reduced. A control means is provided for controlling opening and closing of the inlet openings and thus controlling the power output of the turbine. Preferably, this control means includes means for sensing the power output of the rotor assembly, and for controlling the opening and closing of the inlet opening in accordance therewith. Advantageously, the control means includes a moveable plate associated with each inlet opening of each blade for selectively closing that inlet opening under the control of the control means. As noted above, although not limited to such an application, the invention provides particular advantages when incorporated in a vertical axis, wind-powered Darrieus turbine.

Other features and advantages of the present invention will be set forth in, or apparent from, the detailed description of the preferred embodiments of the invention found hereinbelow.

DESCRIPTION OF THE PREFERRED EMBODIMENTS

Figure 1:
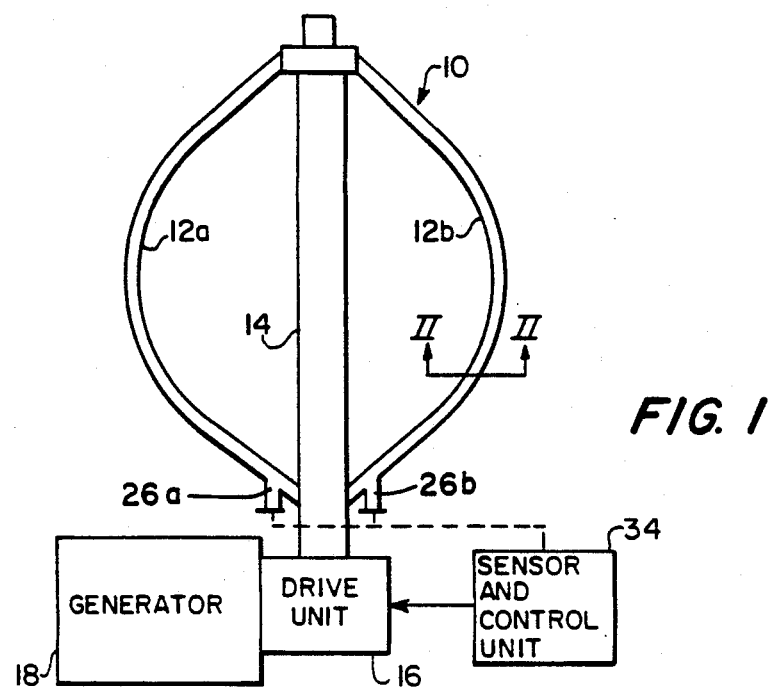
FIG. 1 is a schematic representation, partially in block form, of a vertical axis wind turbine incorporating the power control and limiting system of the invention.

Referring to FIG. 1, there is shown, in schematic form, a vertical axis wind generator incorporating the jet air spoiler system of the invention. Although a Darrieus-type vertical axis turbine is illustrated, it will be understood that the invention is not limited to such a configuration and, in its broadest aspects, is not limited to vertical axis wind turbines.

The system shown in FIG. 1 includes a Darrieus rotor 10 comprising a pair of blades 12a and 12b mounted on a central rotor shaft on tower 14. Power generated by the turbine is transmitted by the rotor 10 through a suitable drive unit 16 to a generator 18. The system as described thus far is a conventional vertical axis wind turbine and the rotor 10, drive unit 16 and generator 18 can, of course, take any suitable form.

Figure 2:
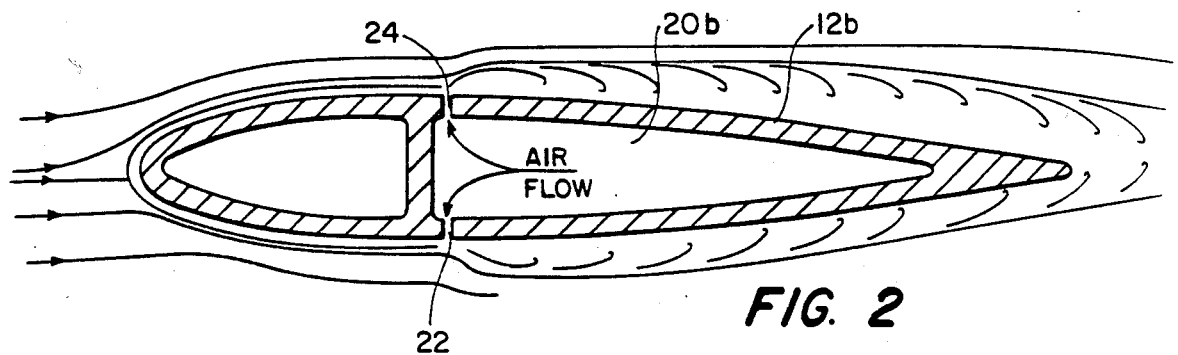
FIG. 2 is a cross section through one of the rotor blades of the turbine of FIG. 1 taken generally along line II—II of FIG. 1.

Referring to FIG. 2, an exemplary section taken through one of the rotor blades, is illustrated. Although the section is taken through blade 12b of FIG. 1, it will be appreciated that both blades are similar in construction and blade 12b is being considered by way of example. As shown in FIG. 2, blade 12b is hollow and includes a central chamber 20b through which air flows. Blade 12b also includes apertures or openings 22 and 24 in the sidewalls thereof through each of which is expelled air drawn up through central chamber 20b, as explained below. A plurality of said apertures are provided along the length of both blades 12a and 12b, and blade 12a includes a similar central chamber 20a (see FIG. 3).

Figure 3:
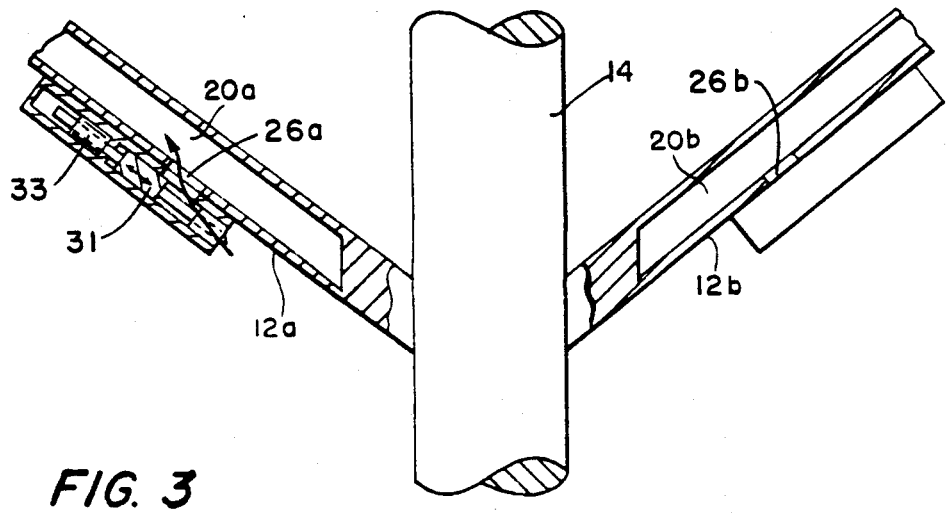
FIG. 3 is a detail of a portion of the turbine of FIG. 1 showing the blade inlet ducts and control plates therefor.

As shown in FIGS. 1 and 3, air for chambers 20a, 20b of blades 12a, 12b is supplied through at least one end of the blades through respective openings 26a and 26b. As turbine rotor 10 spins, air pressure is induced inside of the hollow blades 12a and 12b by centrifugal acceleration. The magnitude of the induced pressure is equivalent to the dynamic pressure of the undisturbed air relative to the moving blades 12a, 12b. Air will flow into the chambers 20a and 20b through openings 26a and 26b, and will flow out of the holes or openings corresponding to holes 22 and 24 along the lengths of each blade. As shown in FIG. 2, the holes 22 and 24 are located rearwardly from the leading edge of the blade approximately one-third of the distance between the leading edge and the trailing edge so as to create turbulence rearwardly from the holes and to thereby cause flow separation, and consequent stall and power reduction, to occur.

The flow of air through openings 22 and 24 along the lengths of the blades is controlled by a modulated valving system located at either or both ends of the turbine blades 12a, 12b. In one embodiment shown in FIG. 3, a movable plate 31 is provided which is moved by electric piston 33 toward and away from an inlet opening 26a to control the rate of the air flow out of the jet spoilers created by openings 22, 24. Movement of plate 31 may be controlled by a feedback system including a sensor and control unit 34 (see FIG. 1) which senses the output power of the turbine at the drive unit 16 and which controls electric piston 33 accordingly. Such an embodiment is extremely simple to implement and involves only a small number of moving parts. It should be noted that additional power is absorbed by the necessity to centrifugally pump the blowing air and thus, the power output is controlled (and reduced) in this manner as well.

Any other means for controlling the flow of air into blade 10 may be used. For example, as shown in FIG. 1, ducts may be provided at the end of each blade which are opened or closed by moving a valve disk away from or into contact with the opening.

A further application of the jet spoiler of the invention is the reduction of aerodynamic torque during an emergency shutdown. This approach allows the use of a smaller brake for the turbine because the brake has to overcome the rotor loading due to inertia and reduced aerodynamics rather than both the rotor inertia loading and the full aerodynamic loading.

Although the invention has been described in detail with respect to exemplary embodiments thereof, it will be understood by those of ordinary skill in the art that variations and modifications may be effected in these embodiments within the scope and spirit of the invention. For example, the invention may be utilized on any turbine having a fluid flow from an inlet near the turbine axis to a series of outlets along the blade radially spaced a greater distance from the axis than the inlet. The inlet may be in a hollow support for a parallel bladed turbine of the type shown in U.S. Pat. No. 4,137,009 of James Telford. In addition, the turbine may be a horizontal axis water-powered turbine. Furthermore, the turbine may comprise from one to several blades, some or all blades incorporating the invention.

It is intended that the scope of the invention be defined by the claims appended hereto.

We claim:

1. A vertical-axis wind turbine comprising a rotor assembly and a load powered from said rotor assembly through a drive unit, said rotor assembly comprising: at least one hollow rotor blade having opposed blade surfaces mounted for rotation about a vertical axis, said blade having an air inlet opening at one end located near the axis and a plurality of air outlet aperture means for causing flow separation along a substantial portion of each blade surface between the leading edge and trailing edge of the blade, said outlet aperture means being further from the axis than said inlet opening;
   whereby air drawn into the inlet opening will flow out of said apertures and interfere with the air flow across the blade, thereby reducing power produced by the turbine.

2. The turbine of claim 1 wherein said load is an electric generator.

3. The turbine of claim 2 further comprising control means for controlling opening and closing of the inlet opening to control the power output of the turbine.

4. The turbine of claim 3 wherein said control means includes means for sensing the power output of the rotor assembly and means for controlling the opening and closing of the inlet opening in accordance therewith.

5. The turbine of claim 4 wherein said control means includes a moveable plate associated with each inlet opening of each blade for selectively closing that inlet opening under the control of said control means.

6. The turbine of claim 1 wherein said rotor comprises at least two blades arranged symmetrically around the axis, and each end of each blade contains an inlet opening.

7. The turbine of claim 6 wherein each opening has an associated control means for controlling opening and closing of the opening to control power output of the turbine.

8. The turbine of claim 1 wherein each said blade is curved and includes spaced end portions fastened to said axis and a connecting portion spaced from said axis, said blade and axis defining a Darrieus turbine.

9. The turbine of claim 1 wherein each said aperture means consists of an aperture extending through the blade from the hollow interior thereof to the outer surface thereof, the axis of said aperture being perpendicular to the surface of said blade.

10. The turbine of claim 5 wherein each control means is mounted to an external surface of a blade.

11. The turbine of claim 8 wherein each said aperture means consists of an aperture extending through the blade from the hollow interior thereof to the outer surface thereof, the axis of said aperture being perpendicular to the surface of said blade.

12. The turbine of claim 8 further comprising means for sensing at least one output parameter associated with the rotation of the rotor assembly and a valving system for controlling the air drawn into said air inlets in accordance therewith.

13. The turbine of claim 12 wherein said parameter is turbine output power and wherein said valving system includes moveable plates relative to the respective air inlets, the positions of said plates being controlled to control the air drawn into the air inlets.

* * * * *